United States Patent [19]

Chapman et al.

[11] Patent Number: 4,609,147
[45] Date of Patent: Sep. 2, 1986

[54] WATER DELIVERY MACHINE FOR AN IRRIGATION SYSTEM

[75] Inventors: John A. Chapman, Wahoo; Thomas M. Johnson, Elkhorn; Donald L. Newbold, Freemont, all of Nebr.

[73] Assignee: Valmont Industries, Inc., Valley, Nebr.

[21] Appl. No.: 583,571

[22] Filed: Feb. 24, 1984

[51] Int. Cl.$^4$ .............................................. B05B 3/18
[52] U.S. Cl. .................................. 239/183; 239/184; 239/711
[58] Field of Search ............... 239/183, 184, 178, 710, 239/711, 720, 721

[56] References Cited

U.S. PATENT DOCUMENTS

| | | | |
|---|---|---|---|
| 870,700 | 11/1907 | Thebus | 239/709 X |
| 3,441,941 | 5/1969 | Purtell | |
| 3,984,052 | 10/1976 | Di Palma | 239/183 |
| 4,036,436 | 7/1977 | Standal | |
| 4,085,771 | 4/1978 | Hunter | 239/720 X |
| 4,172,551 | 10/1979 | Johnson | |
| 4,172,556 | 10/1979 | Standal | 239/183 X |
| 4,274,584 | 6/1981 | Noble | |
| 4,412,655 | 11/1983 | Noble | 239/183 |
| 4,413,783 | 11/1983 | Ostrom et al. | |

Primary Examiner—Joseph F. Peters, Jr.
Assistant Examiner—Daniel R. Edelbrock
Attorney, Agent, or Firm—Zarley, McKee, Thomte, Voorhees & Sease

[57] ABSTRACT

A water delivery machine for delivering water under pressure from a pressurized main line to a linear irrigation system, the main line having spaced risers therealong, and wherein the water is delivered continuously as the linear system moves over the field being irrigated. The machine has fore and aft articulated booms, the inner ends of which are connected to the water conduit of the linear system, and the outer ends of which are connected to couplers. The booms provide water conduits to deliver water from the couplers to the linear system. Each boom includes a conduit section extending generally in the direction of travel of the linear system which is supported on a wheeled cart having inner and outer wheel bogeys. The cart wheels are steered, and at least one of the wheels is driven to drive each of the carts along the main line for alternately and automatically coupling and uncoupling each coupler successively with each riser as the linear system moves over the field to automatically and continuously deliver water first from one coupler and boom and then the other coupler and boom to the linear system.

7 Claims, 21 Drawing Figures

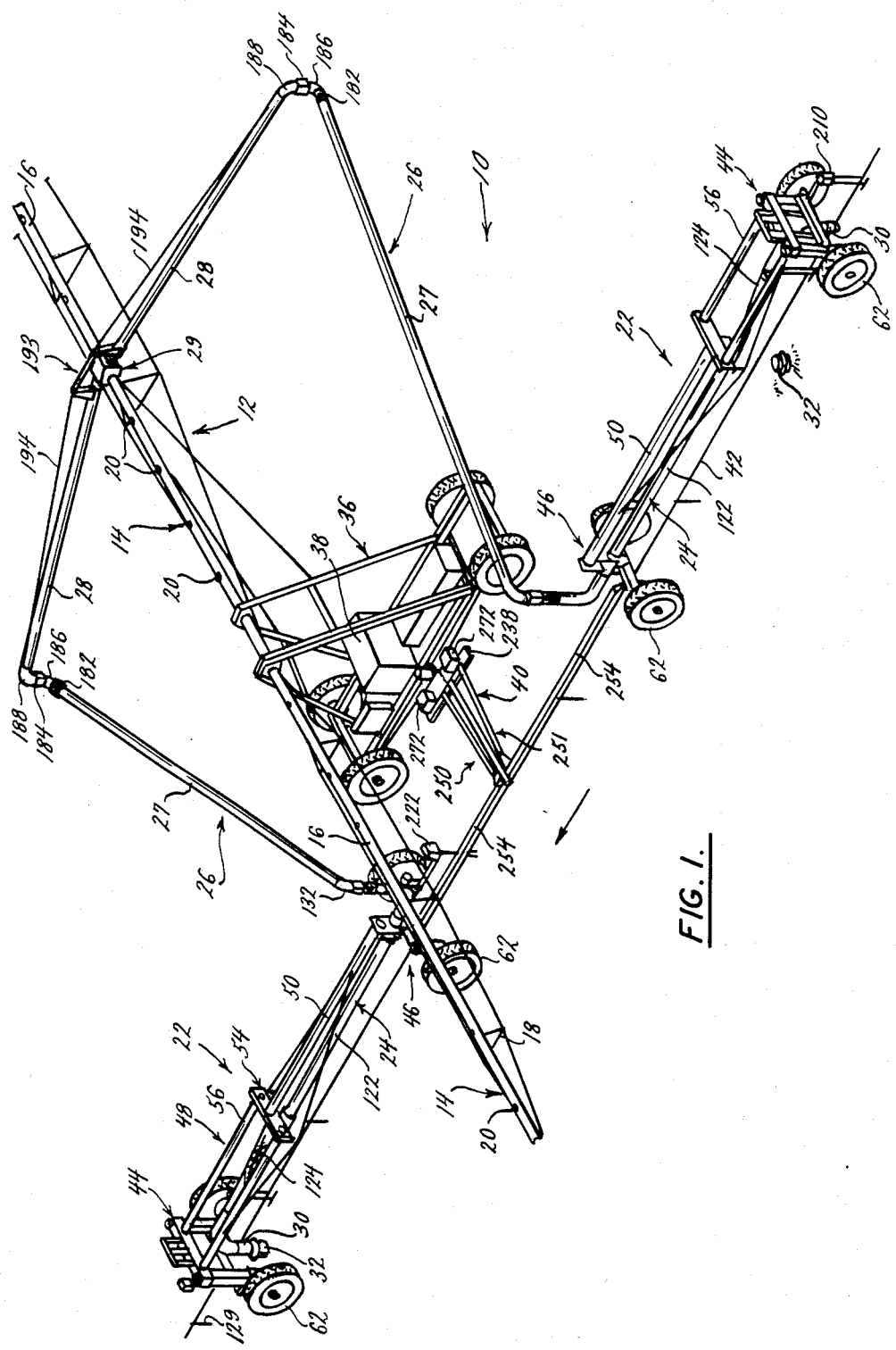
FIG. I.

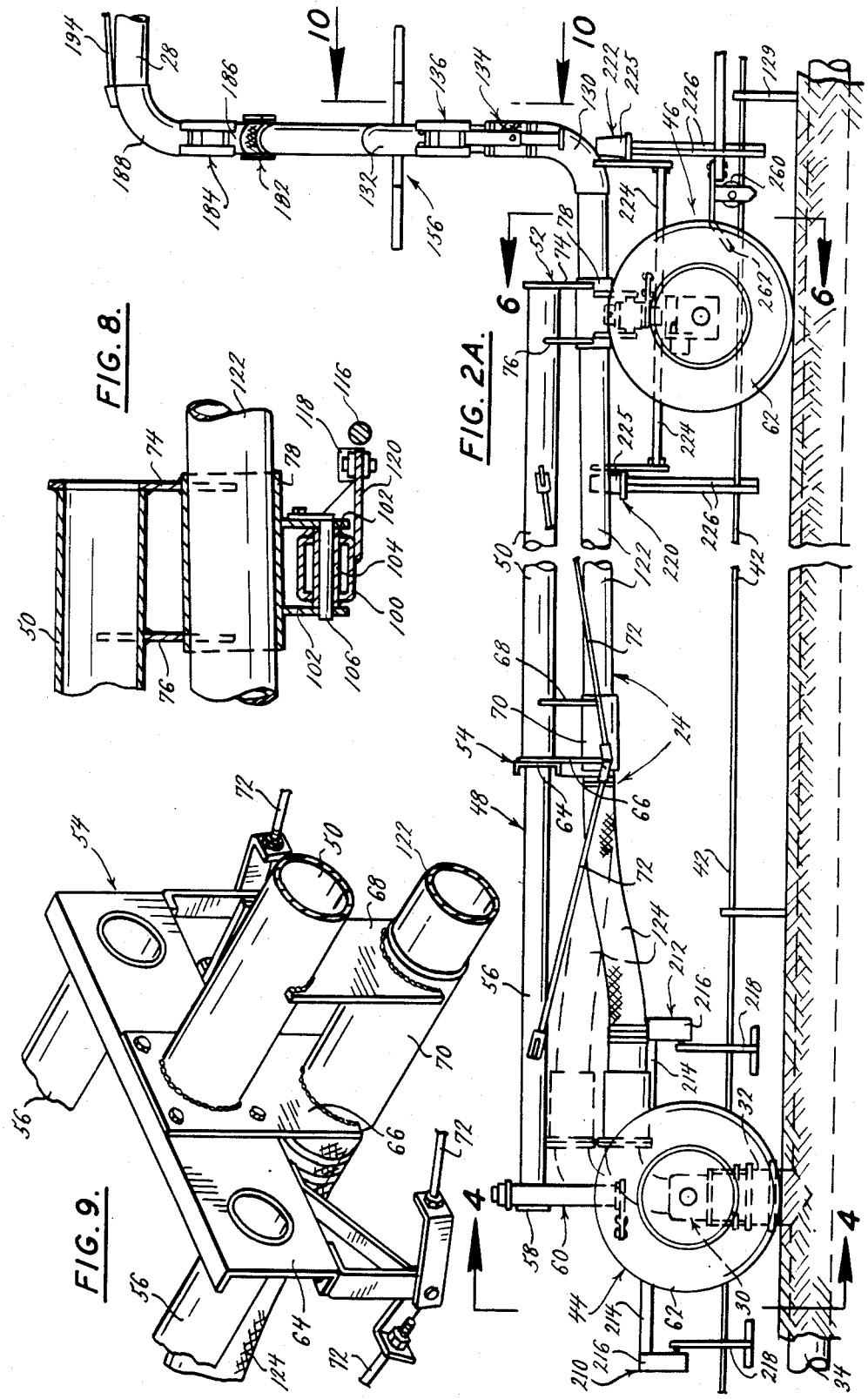

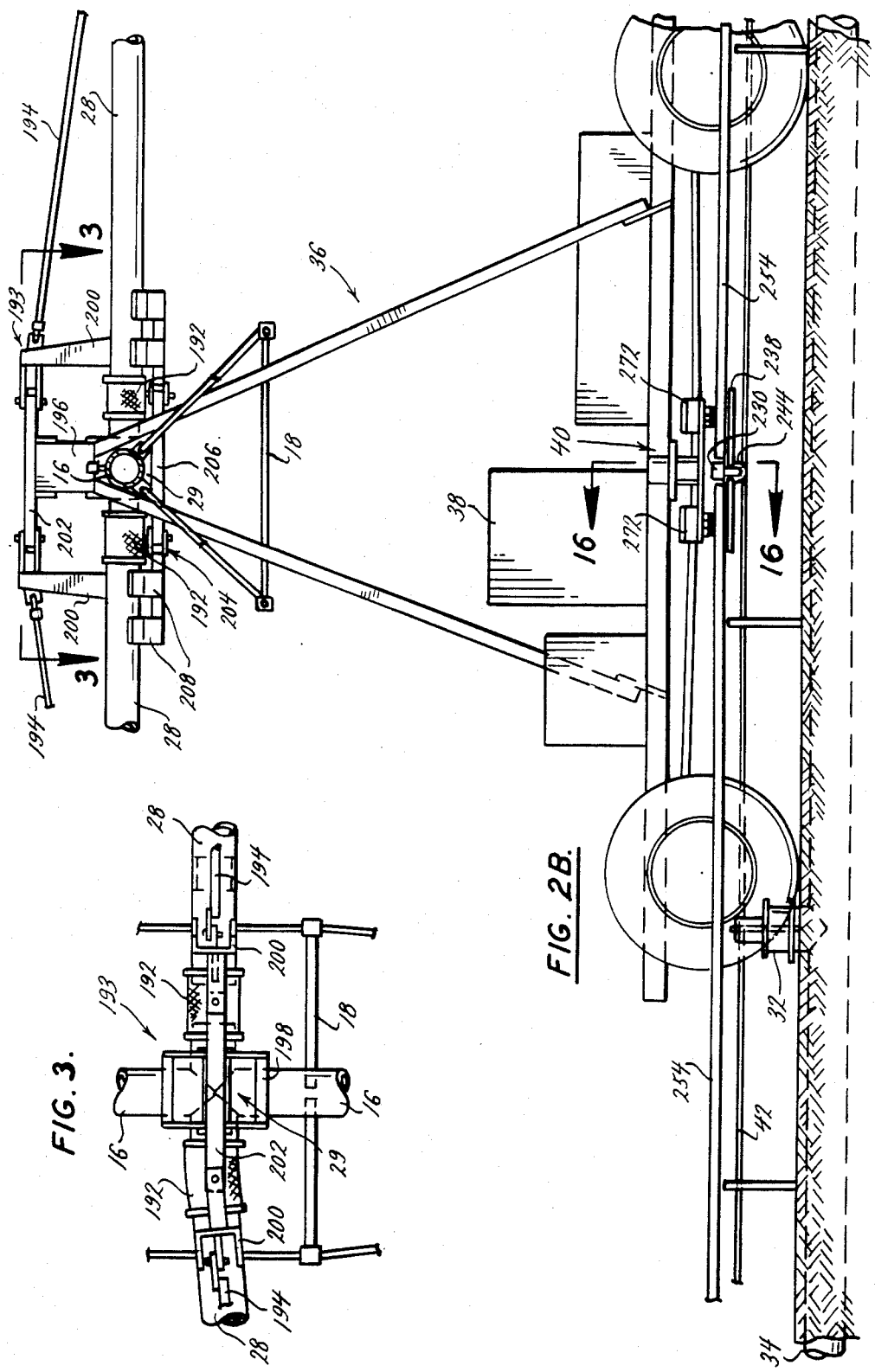

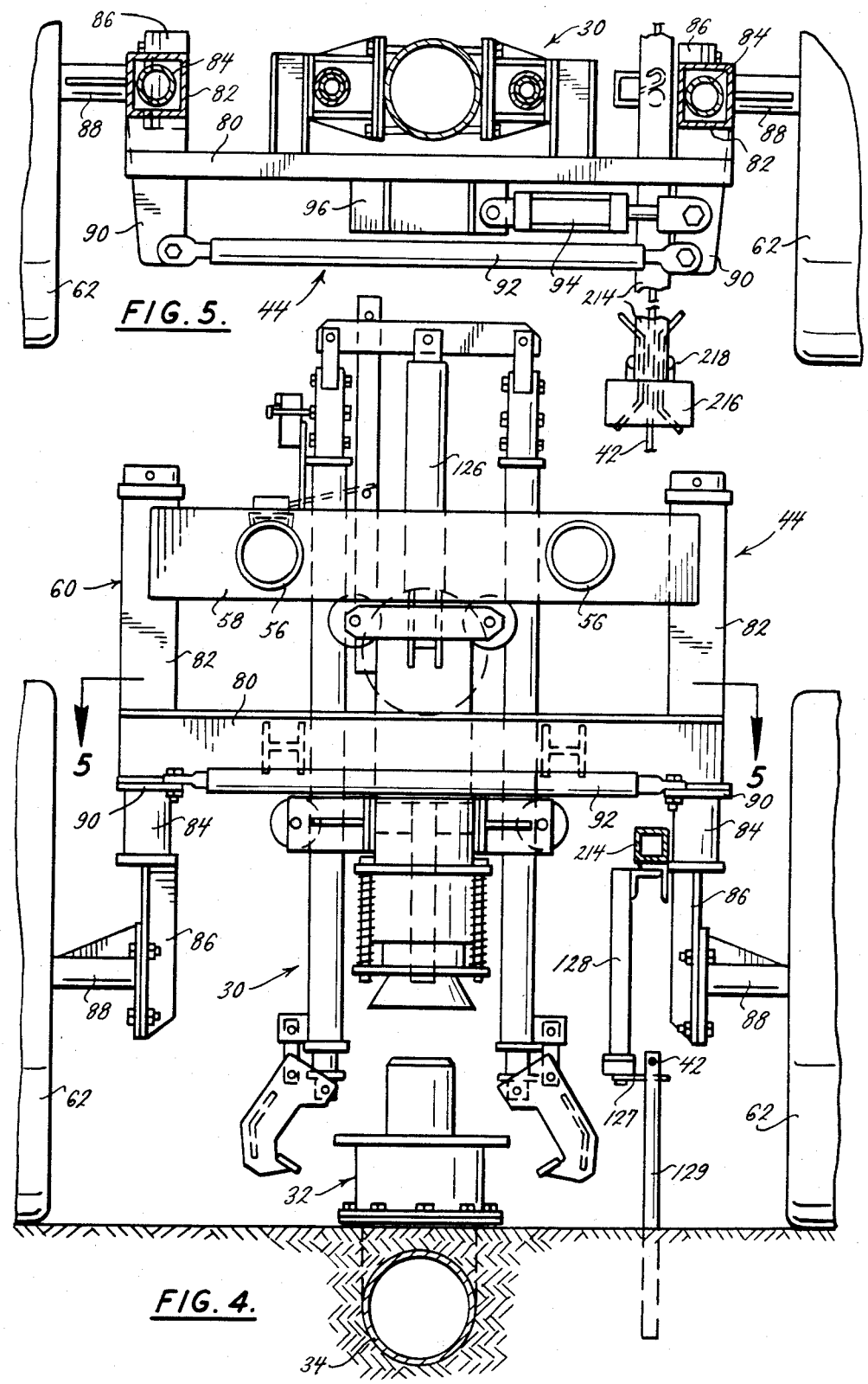

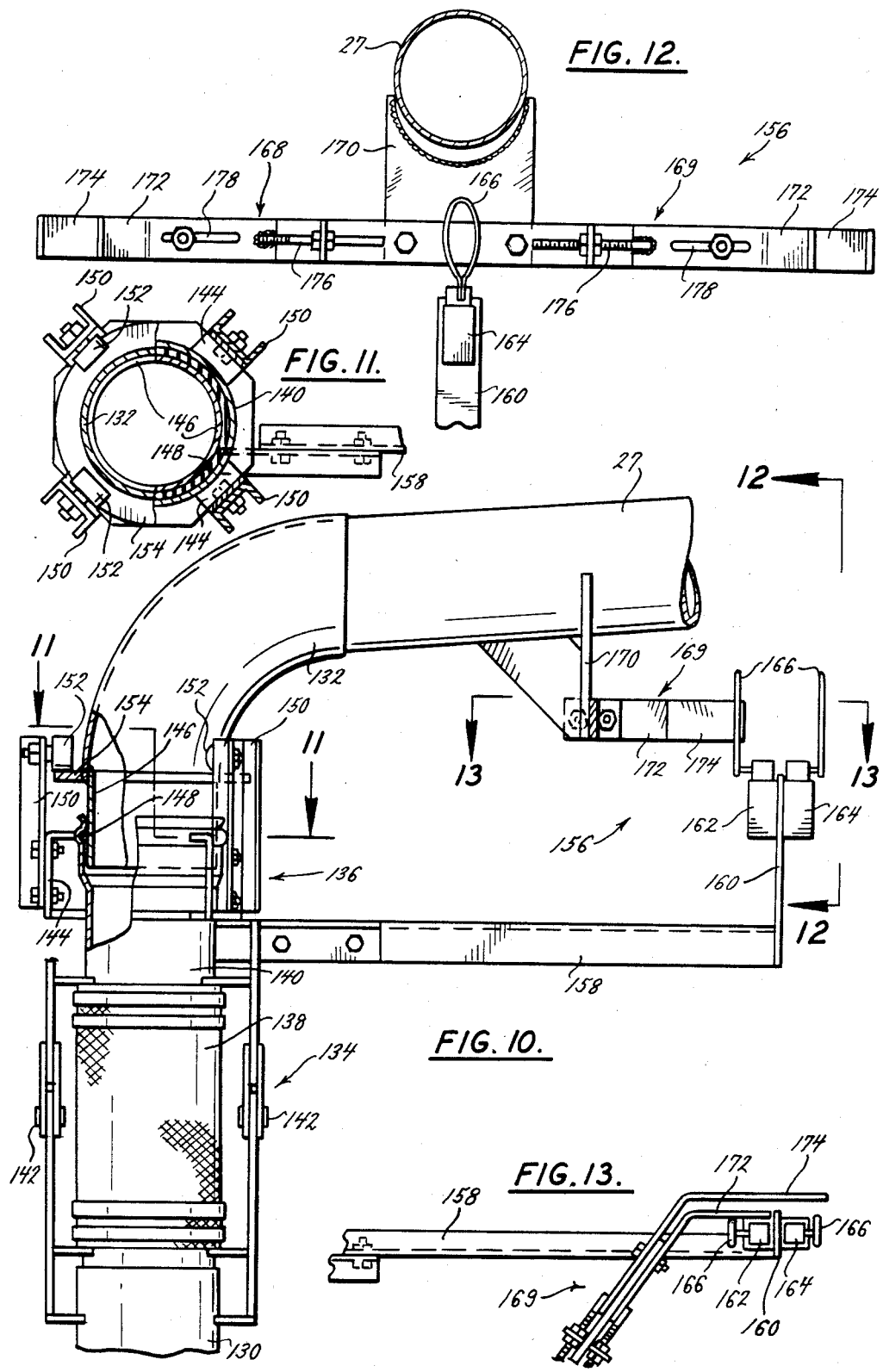

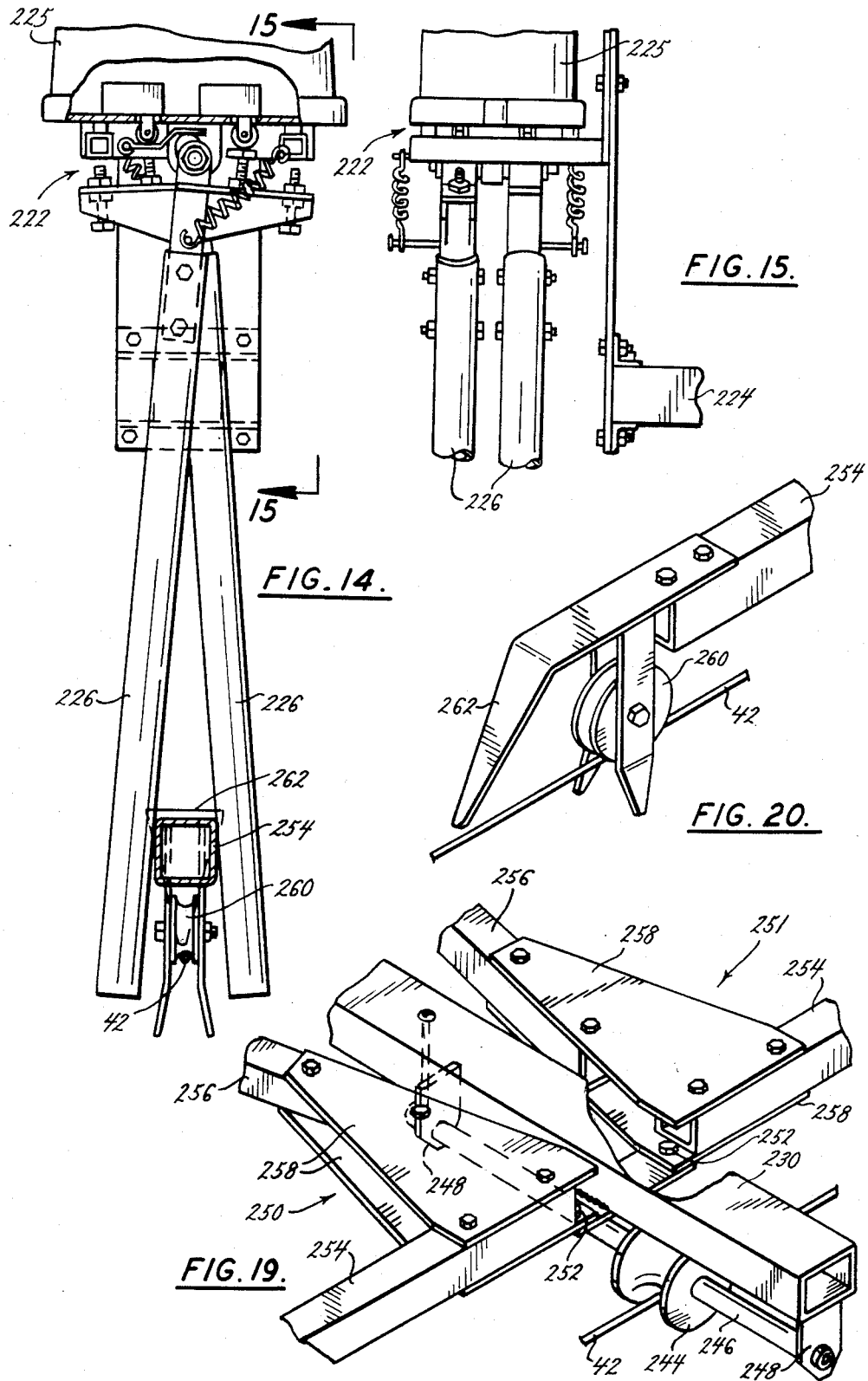

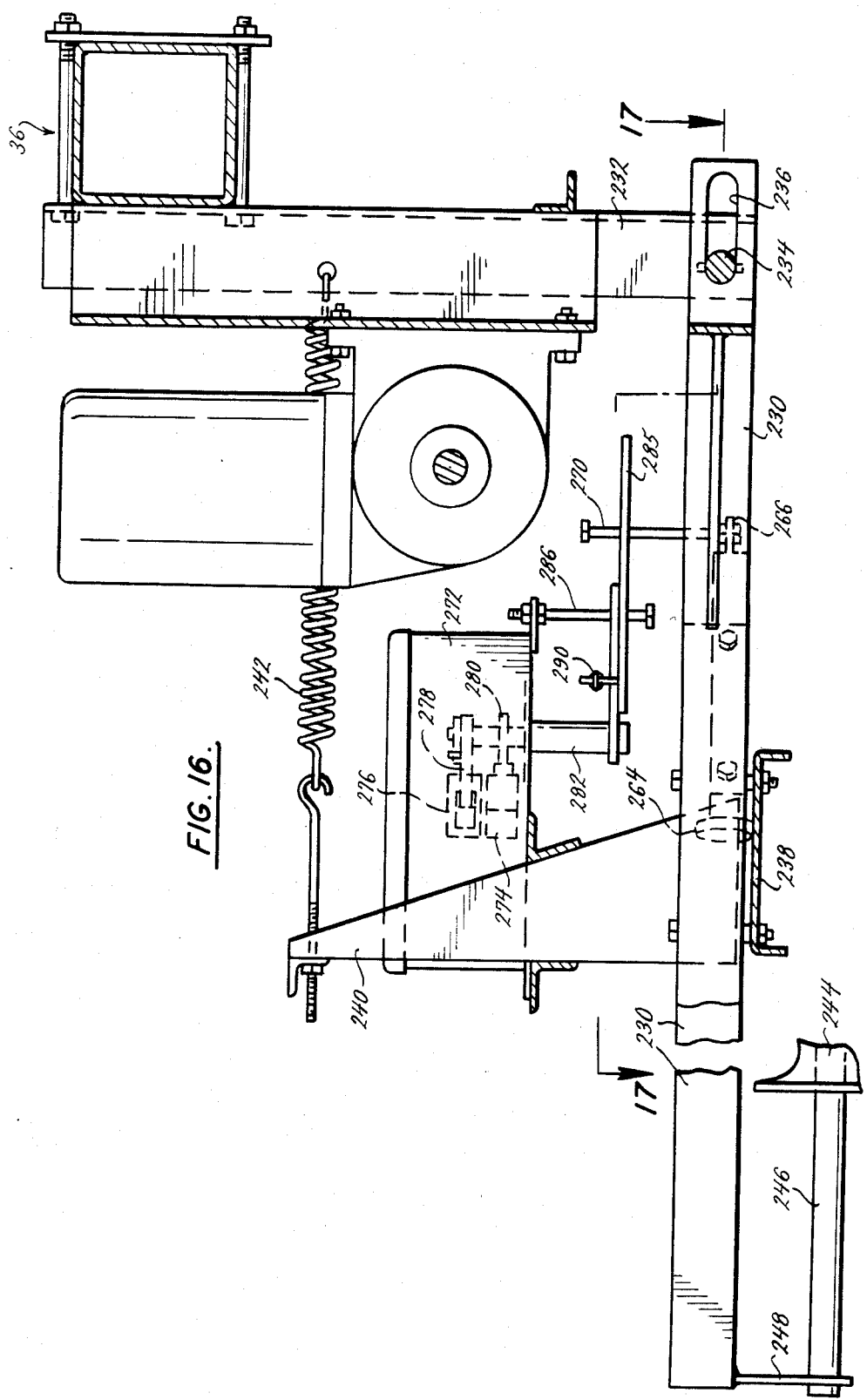

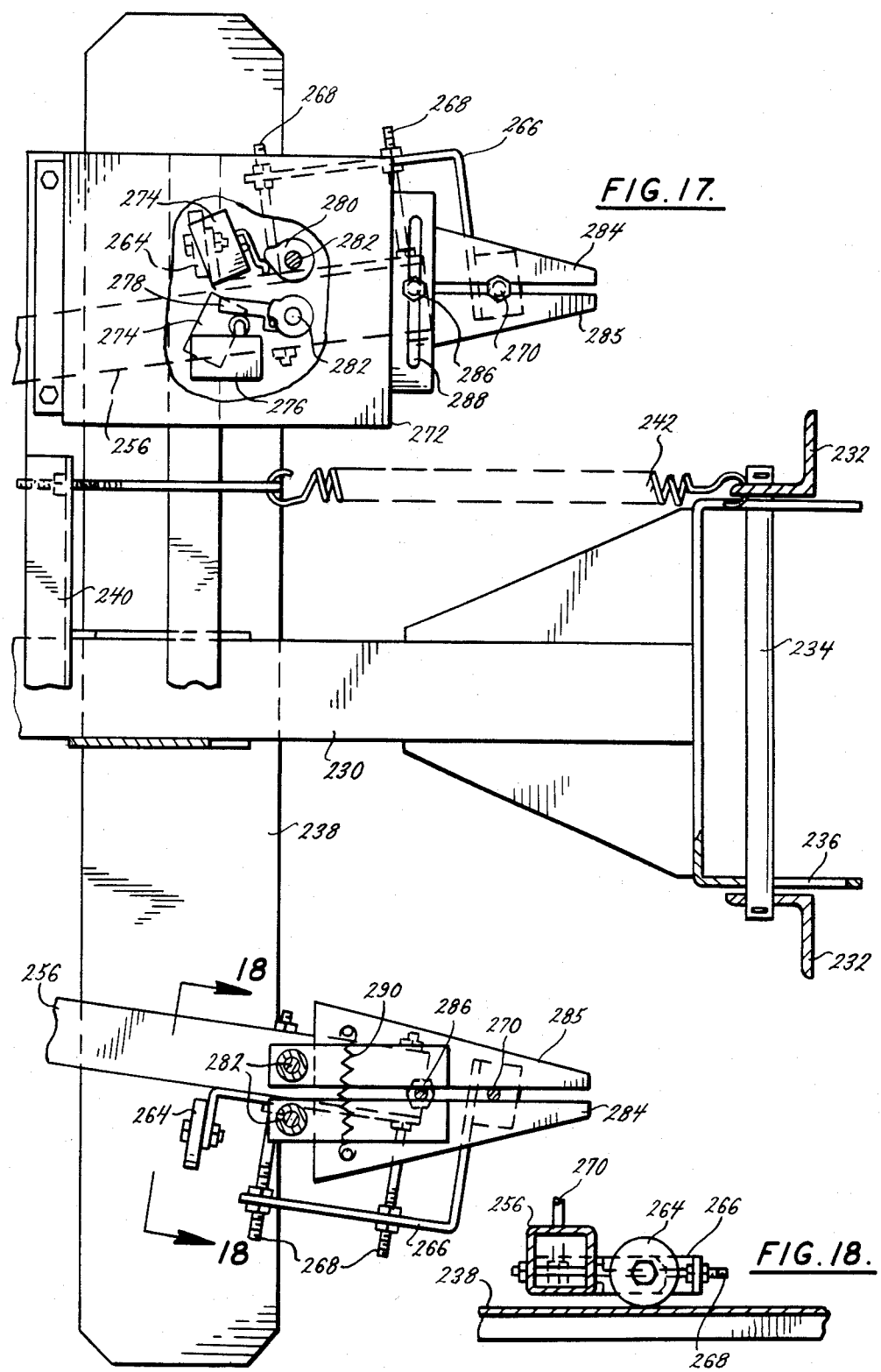

WATER DELIVERY MACHINE FOR AN IRRIGATION SYSTEM

BACKGROUND AND SUMMARY OF THE INVENTION

The present invention relates to a water delivery machine, and particularly such a machine for use with a self-propelled linear irrigator. The machine delivers water automatically and continuously from a pressurized main line to the linear system as the system moves down the field. The machine of the present invention is for use with a pressurized main line having risers or connectors spaced along its length. The machine has couplers carried by carts whereby the couplers alternately connect and disconnect to the risers as the machine and the linear system moves down the field. At least one of the couplers is always connected to a riser so that water, under pressure, is delivered continuously to the linear system. Moreover, this is accomplished without interrupting the operation of the linear system itself.

By way of background, there are two chief problems associated with a linear irrigation system: one is with supplying water to the system as it moves over the field, and the other is with guiding the system over the field to be irrigated. The present invention addresses both of these problems.

Various techniques are known for delivering water to a linear system. One category includes an open ditch extending the length of the field where water is pumped from the ditch to the linear system as it moves to irrigate the field. Another category is the pressurized system where a pressurized main line extends the length of the field and some means are provided for delivering water from the pressurized main line to the linear system. An example of such a pressurized system is the hose drag machine where a flexible hose from the linear system is connected to a riser or hydrant of the pressurized main line so that water is delivered through the hose to the system. One disadvantage of commercial versions of such systems is that the hose must be manually disconnected from one riser and reconnected to the next riser. A patent that addresses this problem is Purtell Patent 3,444,941, wherein the hose is connected to a coupler carried by a single cart which automatically moves from riser to riser as the linear system traverses the field. However, the technique shown by the Purtell patent requires interruption of both the movement of the linear system and the delivery of water as the cart moves from riser to riser.

The present invention is in the pressurized category which uses spaced risers along the pressurized main line, and where water is delivered to the linear system without interruption of either the movement of the linear system or the delivery of water.

Water delivery machines of the general type to which the machine of the present invention generally relates are known in the art. Examples are shown in Russian Patent No. 363,463, U.S. Pat. Nos. 4,036,436, 4,172,556, 4,274,584, and 4,412,655 and in abandoned U.S. patent application Ser. No. 06/161,678, filed June 23, 1980, in the name of Dennis R. Theilen and assigned to the same assignee as the present application, the entirety of said patents and said application being incorporated herein by reference.

The Russian patent discloses such a machine having a main tractor and two carts, each of which has a coupler mechanism for connecting and disconnecting to connectors along a main line. Each of the carts has a hydraulic motor for driving the wheels of the cart. Water is fed from the couplers to the linear system by way of articulated pipes. With the machine of the Russian patent, the two carts and the main tractor are all laterally offset.

Standal U.S. Pat. Nos. 4,036,436 and 4,172,556 disclose a water delivery machine having a main tractor and two reciprocating carts supporting couplers for connecting and disconnecting to the spaced risers as the machine moves along the pressurized main line. In one of the disclosed embodiments, the main tractor is separately powdered, and the carts are made to extend and retract with hydraulic cylinders. Water is delivered from the pressurized main line to the linear system via the couplers and the vertically oriented articulated booms.

Nobel U.S. Pat. No. 4,274,584 discloses a water delivery machine very similar to those of the Russian and Standal patents. With the machine of the Nobel patent, the outer ends of reciprocating water pipes are supported by carts, with their inner ends supported for rolling movement along an "elongated track" which is rigidly secured to the main tractor and which extends generally parallel to the pressurized main line. In a commercialized version of the machine of the Nobel patent, the flexible hoses connecting the inner ends of the water pipes to the linear system are replaced with generally horizontally disposed articulated booms as shown in Noble U.S. Pat. No. 4,412,655. With the machine of the Nobel patent, and its known commercial version, the wheels of each of the carts are driven and steered, and the wheels of the main tractor are driven, to power and guide the machine along a buried pressurized main line.

Both the systems of the Standal and Nobel patents operate in what is known as as "inch worm" fashion. That is, at one position (retracted position) in the cycle, the two couplers are connected to adjacent risers and thus span two risers, and at another position, (extended position), in the cycle, the two couplers span three risers. During operation of these machines, the carts do not pass each other, but rather each coupler connects progressively to each riser.

The machine disclosed in the Theiland application, Ser. No. 06/161,678, also has a main tractor and two reciprocating carts, each carrying a coupler for engaging and disengaging in an inch worm fashion to the spaced risers of the pressurized main line. Water is delivered from the couplers to the irrigation system via reciprocating booms connected between the carts and the main tractor, and hoses connected between the booms and the linear system. The booms are mounted to the main tractor by a rolling connection which allows the booms to reciprocate between extended and retracted positions relative to the tractor. The booms, and hence the carts and couplers, are driven between extended and retracted positions by motor and clutch drives mounted on the main tractor.

A guidance system for guiding a linear irrigation system is disclosed in Johnson U.S. Pat. No. 4,172,551 by the same inventor as the present invention, the entirety of which is incorporated herein by reference. That guidance system has been used in commercial versions to guide both ditch feed and hose drag linears, as well as those supplied water by water delivery machines.

A problem with these prior art water delivery machines, including their commercial versions, has been their expense. The farmer must not only purchase the linear irrigation system, which for example might be a single one-quarter mile (0.4023 km) system or a one-half mile (0.8046 km) system with one-half of the system on either side of the water delivery machine, but must also purchase the water delivery machine itself and the presurized main line with all of the risers. One of the major expenses has been the risers themselves, each of which includes a valve. With riser spacings of from 44 to 50 feet (13.41 to 15.24 meters) on commercial versions, anywhere from 105 to 120 such risers may be required on a mile-long (1.609 km) field. Therefore, riser spacing becomes critical. Another problem has been the capability of such machines to operate on uneven or rough terrain.

The water delivery machine of the present invention provides improvements in both of these problem areas in providing a machine that allows for significantly greater riser spacing with added stability over rough terrain. Thus, in accordance with the present invention, the articulated booms which extend from the couplers to the linear system, include first conduit sections extending generally fore and aft in the direction of the main line with their outer ends connected to the couplers. Both the outer and inner ends of these first conduit sections are supported on wheel bogeys defining carts of substantial length. Coupling mechanisms for connection and disconnection to the risers are mounted at the outer ends of the carts. The articulated booms further include second and third conduit sections, these three sections connected together at swivel joints such that the booms articulate as the machine moves between extended and retracted positions. Preferably, the wheels of both the inner and outer wheel bogeys are steered, and one or more of the wheels of each cart are driven to extend and retract the carts relative to the main tractor and to guide the carts along a preselected path as the machine and linear system move down the field.

By supporting a substantial length of each of the booms (the first conduit section) on wheels to define a cart, a substantial portion of the articulated boom is supported on the ground. This means that the overall length of the articulated boom may be increased to provide greater riser spacing, and thus fewer risers. The boom and cart design also provides control over rougher terrain, and eliminates the need for an "elongated track" rigidly mounted to the main tractor with roller mechanisms for supporting the inner ends of the first conduit sections as with some prior art machines. Moreover, limited independent pivotal movement about an axis generally parallel to the direction of travel is provided as between the inner and outer wheel bogeys supporting each of the carts, and as between the cart frame and the conduit section supported thereon, to accomodate uneven terrain. As a result, reliable coupling and uncoupling of the couplers with the risers is achieved within acceptable limits although the main tractor and the wheel bogeys of the carts are each traveling over different terrain at a given instant of time.

The guidance system of the present invention provides accurate and reliable guidance for both the water delivery machine and the linear irrigation system. In principle, it incorporates the teachings of said Johnson U.S. Pat. No. 4,172,551 and also provides guidance off a single guide cable where the main tractor is laterally offset therefrom and from the carts.

These and other advantages of the invention are apparent from the drawing and the detailed description to follow.

DESCRIPTION OF THE DRAWINGS

FIG. 1 is an isometric view of the water delivery apparatus of the present invention;

FIGS. 2A and 2B are side elevation views of the machine of FIG. 1 with FIG. 2A showing a side elevation view of the cart assembly in a more extended position than shown in FIG. 1, and FIG. 2B showing a side elevation view of the main tractor assembly;

FIG. 3 is a view taken generally along the line 3—3 of FIG. 2B of the bridge connection for the articulated booms used with the present invention;

FIG. 4 is an end view taken generally along the line 4—4 of FIG. 2A showing the outer end of one of the carts and the coupler assembly used with the present invention;

FIG. 5 is a view in section taken generally along the line 5—5 of FIG. 4;

FIG. 8 is a view in section taken generally along the line 8—8 of FIG. 6;

FIG. 9 is an isometric view of a mid-portion of one of the carts;

FIG. 10 is a view in section taken generally along the line 10—10 of FIG. 2A;

FIG. 11 is a view in section taken generally along the line 11—11 of FIG. 10;

FIG. 12 is a view in section taken generally along the line 12 12 of FIG. 10;

FIG. 13 is a view in section taken generally along the line 13—13 of FIG. 10 but showing the position of the angle sensor with the boom and cart in the fully-extended position for normal operation;

FIG. 14 is a view in section taken generally along the line 14—14 of FIG. 7;

FIG. 15 is a view taken generally along the line 15-15 of FIG. 14;

FIG. 16 is a view in section taken generally along the line 16—16 of FIG. 2B and showing a portion of the guidance mechanism for the system;

FIG. 17 is a view in section taken generally along the line 17—17 of FIG. 16;

FIG. 18 is a view in section taken generally along the line 18—18 of FIG. 17;

FIG. 19 is an isometric view showing a portion of the guidance linkage; and

FIG. 20 is an isometric view showing the connection of the outer end of one of the linkage arms to a guidance cable in accordance with the invention.

DETAILED DESCRIPTION OF A PREFERRED EMBODIMENT

Figure 6:
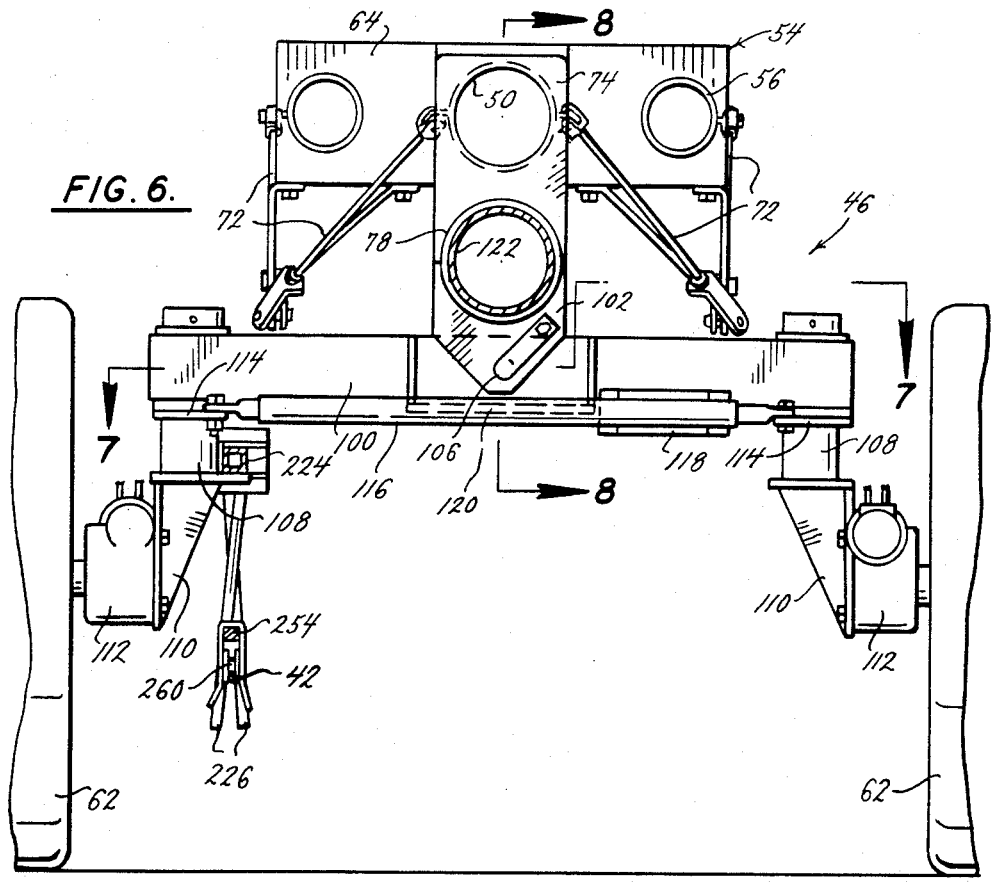
FIG. 6 is a view in section taken generally along the line 6—6 of FIG. 2A at the inner end of one of the carts.

With reference to the drawing, there is shown a water delivery machine 10 of the present invention for use with a self-propelled linear irrigation system 12 of a type well known in the art. The linear system 12 includes a series of spans 14, each span having a water conduit 16 with a truss arrangement 18 and supported for movement on the ground by a self-propelled support tower (not shown). The spans are connected end to end to form a continuous conduit 16 which has spaced sprinklers 20, or the like, for dispensing water onto the field being irrigated. Typically, an alignment control (not shown) is provided at the joint between adjacent spans to maintain those spans in alignment, such controls being well known. An example of such a linear irrigation system is shown and described in said U.S. Pat. No. 4,172,551.

The water delivery machine 10 of the present invention generally includes four wheel carts 22 supporting conduit sections 24 of articulated booms 26. Each boom also includes an intermediate conduit section 27 and an inner conduit section 28 pivotally joined. The inner ends of the booms 26 are connected to the conduit 16 of the linear system by means of a manifold 29 (FIG. 3). The outer ends of the booms 26 are connected to couplers 30 supported by the carts 22. The couplers 30 automatically connect and disconnect to risers 32 spaced along the length of a pressurized main line 34 (FIGS. 2A, 2B, and 4). The main line 34 may be buried with the risers extending upwardly above the ground surface, or the main line may be above the ground surface. Each of the risers includes a valve therein, and may be of the type disclosed in U.S. Pat. No. 4,413,783, the entirety of which is incorporated herein by reference).

The connections of the inner ends of the booms 26 at the manifold 29 are at a location spaced along a span 14 of the linear system from a main tractor 36. The main tractor 36 functions in some ways similar to that of a standard two wheel self-propelled support tower for a linear irrigation system in that it supports the end of a span, or the ends of adjacent spans, and has a motor drive for driving the wheels of the tractor. However, the tractor 36 is heavier in construction than the standard support tower, and preferably has four wheels to support the additional weight imposed by the connection of the booms 26 to the span, and by a generator 38, fuel tank, and other equipment mounted to the main tractor. The generator 38 supplies electrical power to the entire system. The main tractor may be similar to the four wheel support tower of Theilen Application Ser. No. 06/161,678. Also mounted to the main tractor 36 is a guidance control 40 for guiding the linear system over the field and along a preselected path defined by an above ground guide cable 42.

It is to be understood that the water delivery machine of the present invention may be used with a linear system that extends in one direction from the main tractor 36, where the main tractor would then correspond to the end support tower of the system, or with a linear system that extends in both directions from the main tractor (as shown), where the main tractor corresponds to a support tower generally at the center of the system. Typically, and by way of example only, an end feed system might be one-quarter mile (0.4023 km) long, and a center feed system might be one-half mile (0.8046 km) long.

In describing the water delivery machine of the present invention in more detail, it is to be understood that the two carts 22 are basically identical, as are the two articulated booms 26. The carts 22 and couplers 30 will be described with particular reference to FIGS. 1 through 9 of the drawing.

Each cart 22 includes an outer wheel bogey 44 and an inner wheel bogey 46 supporting a frame structure 48. The frame structure has a tubular member or a pipe 50 secured at its inner end to a support bracket 52 and its outer end to a support bracket 54, the pipe 50 extending generally parallel to the pressurized main line. As seen, the bracket 52 is located generally above the inner wheel bogey 46, and the bracket 54 is located between the two wheel bogeys. Also secured to the bracket 54 are parallel, laterally spaced, pipes 56 which extend rearwardly therefrom and have their rearward ends secured to cross plates 58 of a vertical frame support 60 of the outer wheel bogey 44. The vertical frame support 60 may be as described in said U.S. Pat. No. 4,413,783, and is supported on the ground by wheels 62.

Referring to FIGS. 2A, 8 and 9, the support bracket 54 has a flanged member 64 to which the ends of the pipes 50 and 56 are secured. Depending from the member 64 and the pipe 50 are plates 66 and 68 to which a tubular sleeve 70 is secured at the lower ends thereof. Additional support for the bracket 54 is provided by support rods or cables 72 connected between the bracket and the pipes as shown.

The support bracket 52 at the inner end of the cart is similar to the bracket 54 and includes plates 74 and 76 to which the pipe 50 is secured and which depend therefrom. A sleeve 78 is supported at the lower ends of the plates in axial alignment with the sleeve 70. Thus, the generally horizontal pipes 50 and 56, the support brackets 52 and 54, and the vertical frame 60, generally constitute the frame 48 of the cart.

The outer wheel bogey 44 (FIG. 4) is similar to that shown in said U.S. Pat. No. 4,413,783, and includes the vertical frame 60 with the cross plates 58 and cross channel brace 80 spaced below it. Vertical tube members 82 are at either end of the cross members and receive vertical tubes 84 for rotation therein. The lower ends of the tubes 84 are connected to wheel brackets 86 to which are connected the axles 88 of the wheels 62. The brackets 86 have arms or flanges 90 between which is connected a tie-rod 92. A hydraulic cylinder 94 is connected between one of the flanges 90 and a frame bracket 96, such that operation of the cylinder 94 steers the wheels. It will be noted that in this described embodiment, the wheels 62 are not driven. However, it is to be understood that either or both of the wheels may be driven by providing suitable motor and gear drives such as shown and described in said U.S. Pat. No. 4,413,783. Also, while not shown in the drawing, the bogey 44 may also include the leveling system shown and described in abandoned U.S. patent application Ser. No. 06/353,034 filed Mar. 1, 1982, and assigned to the same assignee as the present application, the entirety of which is incorporated herein by reference. In accordance with the teachings of said application, the frame 60 is maintained level as the wheels 62 travel over uneven terrain so as to properly orient the coupler 30 relative to the riser 32 to provide smooth and reliable connection and disconnection of the coupler with the riser.

Figure 7:
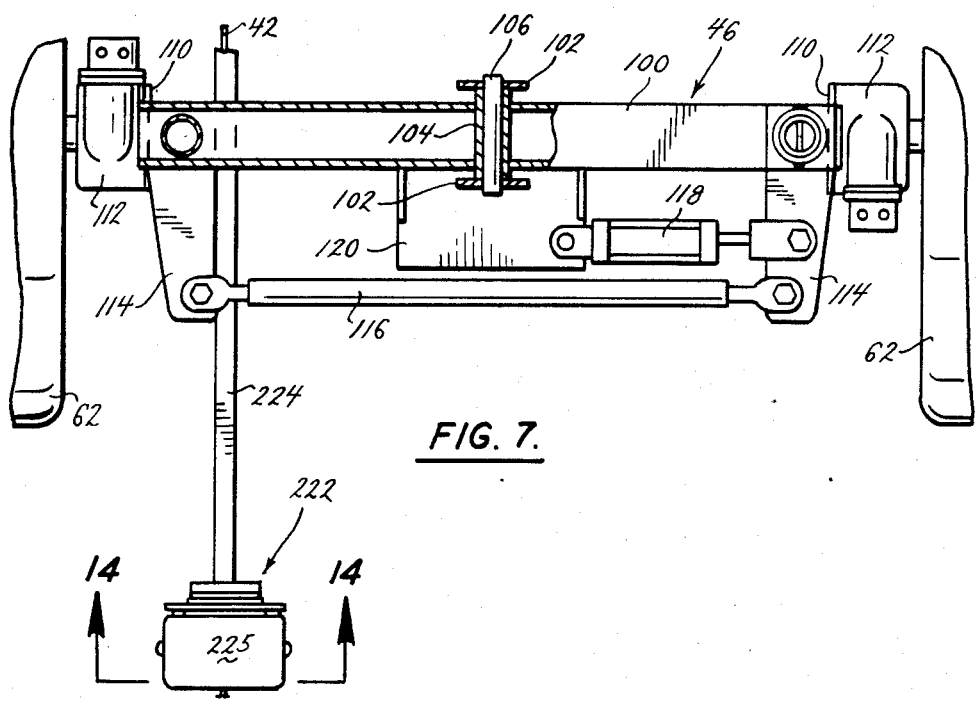
FIG. 7 is a view in section taken generally along the line 7—7 of FIG. 6.

The inner wheel bogey 46 is pivotally attached to the frame 48 so as to allow pivoting of the bogey relative to the frame about an axis generally parallel to that of the direction of movement of the system. The wheel bogey 46 includes a transversely extending generally horizontal beam 100 pivotally connected at the lower end of the bracket 52 to flanges 102 depending from the sleeve 78 (FIGS. 7-9). A sleeve 104 extends through the beam at a midway location, and the beam is pivotally mounted to the flanges 102 by means of a pin 106 extending through the sleeve 104 and aligned openings in the flanges. The outer ends of the beam 100 rotatably receive vertical tubes 108. At the lower ends of the tubes 108 are wheel brackets 110 to which are mounted motor and gear drives 112 for driving wheels 62 of the bogey. Flanges 114 extend from the tubes 108 and have a tie-rod 116 connected therebetween. A hydraulic cylinder 118 is connected between one of the flanges 114 and a bracket 120 secured to the beam 100, such that operation of the cylinder steers the wheels 62. Therefore, the inner wheel bogey 46, through its pivotal mounting, is allowed within acceptable limits to follow the ground terrain without affecting the orientation of the cart frame 48. Also, as with the outer wheel bogey 44, the wheels of the inner wheel bogey are steered to stay on the defined path as will be further explained.

The conduit sections 24 supported on the carts each include a rigid pipe portion 122 and a flexible hose portion 124 (FIG. 2A). The rigid pipe portion 122 extends through the sleeves 70 and 78 of the brackets 54 and 52 so that the rigid pipe portion 122 may pivot or rotate about its longitudinal axis within the sleeves. The flexible hose portion 124 is connected between the rear end of the pipe portion and the coupler 30 and allows vertical movement of the coupler 30 between the solid and phantom line positions shown in FIG. 2A for connection or disconnection of the couple with a riser. Preferably, the coupler is of the design and construction disclosed and described in said U.S. Pat. No. 4,413,783, the coupler being mounted to the frame 60 (FIG. 4) for vertical movement between coupled and uncoupled positions by appropriate actuation of a hydraulic cylinder 126. The cylinder 126 corresponds to the cylinder 30 of said patent, and FIGS. 4 and 5 of the drawing correspond to FIGS. 2 and 3 of said patent. The structure and operation of the coupler is fully explained in said patent, and includes suitable switches which detect the coupled and uncoupled positions and which are part of the electrical control network for the machine. Also included is an actuator 127 mounted at the bottom of a vertical arm 128 for actuation of a switch upon engagement of a post or stake 129. The stake is located adjacent each riser. The switch is part of the electrical control network whereby actuation of the switch stops the cart with the coupler over the riser and initiates connection with the riser, all as described in said patent.

The inner end of each conduit section 24 extends somewhat inwardly of the wheel bogey 46, and is connected to conduit section 27 by means of 90° elbows 130 and 132, between which are a flexible joint 134 and a swivel joint 136 (FIGS. 2A and 10). The flexible joint includes a short flexible hose section 138 connected between the elbow 130 and a pipe connector 140. Pivot braces 142 are located at each side of the flexible hose section 138 to give structural stability while allowing flex about an axis generally transverse to the direction of movement of the system to accommodate for uneven terrain. The swivel joint 136 includes four brackets 144 spaced about the flared end of the pipe connector 140. The elbow 132 has a lower male end 146 that extends within the flared end of the pipe connector 140 for pivotal movement with respect thereto. An O-ring type seal 148 between the two pivotal parts affects a liquid tight seal. Channel members 150 extend vertically from the brackets 144 and have rollers 152 mounted at their upper ends which ride on an annular rail 154 surrounding the male connector 146. The brackets 144, channel members 150, rollers 152, and annular rail 154 provide structural support for the swivel joint while allowing the mating connectors of the joint to pivot freely with respect to each other and while also providing a liquid tight seal therebetween.

Located generally at the swivel joints 136 are angle sensors 156 for sensing the angular displacements of the conduit sections 27 relative to the conduit sections 24. The angle sensors determine the maximum extensions and retractions of the carts 22 as will be further explained. Each angle sensor 156 includes an arm 158 having one end secured to the pipe connector 140 and extending outwardly in a direction generally normal to the direction of movement of the system. At the outer end of the arm 158 is a vertical arm 160 to which are mounted switches 162 and 164, each having an actuator 166. The switch 162 controls the drive of the cart and main tractor under normal operating conditions, and the switch 164 is a safety switch which, if actuated, shuts down the entire system. Adjustable arms 168, 169 are connected to the conduit section 27 above the arms 158 by a bracket 170 that depends from the conduit section 27. Each of the arms 168, 169 has an inner member 172 and an outer member 174, the inner member for engagement with the actuator of the switch 162, and the outer member for engagement with the actuator of the switch 164. Both the inner and outer members are adjustable by way of turnbuckles 176 and set screws and slots 178 so that the angular displacements upon which the switches 162 and 164 are actuated may be adjusted.

The switch 162 is a double actuated switch. Thus, for a given direction of travel for the irrigation system, when the conduit section 27 is angularly displaced relative to the conduit section 24 in one direction by a prescribed amount, one end of the inner member 172 of the arm 168 engages the actuator of the switch 162 to cause the switch to be actuated in one direction to stop the cart 22. When the conduit section 27 is angularly displaced relative to the conduit section 24 in the opposite direction by a prescribed amount, the other end of the inner member 172 engages the actuator of the switch 162 to cause the switch to be actuated in the opposite direction to stop the main tractor. The operation of the switch 162 is reversed with the irrigation system traveling in the opposite direction. FIG. 13 illustrates these conditions with the boom and cart fully extended. If for some reason actuation of the switch 162 fails to stop the cart or main tractor, further movement of the cart or main tractor will cause the outer member 174 to actuate the safety switch 164 and shut down the entire system.

Thus, the water conduit sections 27 extend generally laterally (depending upon the positions of the carts relative to the main tractor) from the inner ends of the conduit sections 24, and slope somewhat upwardly toward the outer ends of conduit sections 28. The conduit sections 27 and 28 of each boom are connected by a flexible joint 182 (like the joint 134), and a swivel joint 184 (like the swivel joint 136). See FIGS. 1 and 2A. The flexible joint 182 allows flex through the joint about a generally horizontal axis normal to the longitudinal axis of the conduit section 27. The joint between these conduit sections also includes elbows 186 and 188. Therefore, the conduit sections 27 and 28 are allowed to swivel relative to each other about a generally vertical axis as with the conduit sections 24 and 27.

Each of the conduit sections 28 is connected to the water conduit 16 of the linear irrigation system at the manifold 29 through a flexible joint 192 (FIG. 2B) similar to the flexible joint 134. The flexible joint 192 allows swinging movement of the conduit section 28 relative to the conduit 16 of the linear system about a generally vertical axis. The articulated booms 26 are supported in elevation at the swivel joints 184 by bridge 193 and guy cables or rods 194 connected between the bridge and the outer ends of the conduit sections 28. The bridge includes a central vertical support member 196 extending upwardly from a base 198 secured to the manifold 29. Additional vertical support members 200 extend upwardly from the conduit sections 28 just outwardly of the flexible joints 192. The upright members 196 and 200 are joined at the top by a cross bar 202, the guy rods 194 being attached near the tops of the posts 200. As further support for the conduit sections 28, a cradle 204 is located beneath the manifold 29. The cradle has an arm 206 secured to the conduit 16, and pivotally connected to the outer ends of the arm 206 are cradle members 208 which support the conduit sections 28 from beneath.

As previously explained, it is preferred that the wheels of each of the bogeys 44 and 46 of each cart are steered in order to keep the carts on the preselected path defined by the above ground cable 42. The wheels of the outer wheel bogey 44 are steered in response to steering controls 210 and 212, (FIGS. 1 and 2A) the control 210 operating to sense the location of the wheel bogey 44 relative to the cable 42 when the system is moving in one direction along the main line, and the control 212 performing the same function with the system moving in the opposite direction. The control operating for a given direction of travel is the one that is forward of the wheel bogey relative to the direction of travel. Hence, each of the controls 210 and 212 are located at the end of forwardly extending arms 214 and include switches located in boxes 216, which are part of the electrical control circuit for the machine and which are actuated by depending levers 218. When the wheel bogey 44 tends to get off the path, one of the levers engages the cable 42 causing the lever to swing and actuate a switch within the box 216. This operates a control circuit which controls the cylinder 94 to steer the wheels and hence the wheel bogey 44 back toward the cable. A steering system of this type is disclosed in said U.S. Pat. Nos. 4,413,783 and 4,172,551.

The wheels of the wheel bogey 46 are steered essentially the same way as those of the wheel bogey 44. Hence, there are provided steering controls 220 and 222 (FIG. 2A) at the forward ends of arms 224, the term "forward" being used relative to the direction of travel of the system. The controls include switches located within boxes 225 which are actuated by depending levers 226. If the wheel bogey 46 gets off path as defined by the cable 42, one of the levers 226 is allowed to swing down to a basically vertical position, actuating a switch which is part of the control circuit to actuate the cylinder 118 so as to steer the wheels and hence the wheel bogey back toward the cable. With the wheels of both of the cart bogeys being steered, the cart can "crab" if necessary to make a corrective movement back toward the defined path. Thus, if the system is traveling to the left as viewed in FIG. 2A, the steering controls 210 and 220 are in operation to steer the cart wheels, and if the system is moving to the right the controls 212 and 222 are in operation to steer the cart wheels.

In addition to steering the cart wheels to maintain the carts on the prescribed path, the linear system 12 itself also must be guided to remain on path so that the linear system remains generally orthogonal to its direction of movement and to the pressurized main line, and so that its lateral displacement relative the carts 22 remains generally constant within acceptable tolerances. To put it another way, the lateral displacement of the main tractor 36 relative the pressurized main line, and its orientation with respect to the main line, must remain constant within acceptable tolerances, for there must be proper positioning of both the linear system and the carts relative the pressurized main line for reliable operation. This is achieved by steering the cart wheels as previously described, and through the guidance control 40 which incorporates the principles disclosed and described in Johnson Pat. No. 4,172,551, and allows the use of a single guide cable 42 even where the main tractor 36 is offset laterally from the carts 22.

With particular reference to FIGS. 1, 2B and 16 through 20, the alignment control 40 includes an arm 230 extending laterally from the main tractor 36 toward the guide cable 42. The arm 230 is pivotally connected to a frame member 232 of the main tractor by means of a pin 234 and slot 236. A horizontal flanged plate 238 is supported by the arm 230 at a location spaced outwardly from the frame member 232, and brackets 240 extend vertically from the arm at the same location as the plate. The arm is held in a raised generally horizontal position by means of springs 242 connected between the upper ends of the brackets 240 and the frame member 232. Beneath the outer end of the arm 230 is mounted a roller 244 on a shaft 246 supported by brackets 248 depending from the arm. The roller 244 rides on the guide cable 42 with sufficient weight while resiliently supported by the springs to maintain contact with the cable as the machine travels therealong.

A pair of linkages 250 and 251 (FIG. 19) are pivotally mounted as shown at 252 to the arm 230 near its outer end for pivotal movement about generally vertical axes. The linkages 250 and 251 are identical with each including an arm member 254 extending above and generally parallel to the cable 42, and an arm member 256 forming a fixed acute angle with the arm member 254 by means of corner plates 258 and extending generally toward the main tractor. Preferably, the arms 254 are of a length to extend substantially beyond the wheels of the main tractor, with the outer ends of each of the arms supported on the guide cable 42 by a roller 260. (FIG. 20) Also at the outer end of each arm 254 is a wedge plate 262 so that the depending levers 226 of the steering controls 220 and 222 may pass easily over the arms 254 as the water delivery machine 10 is operated toward a retracted position (where the couplers 30 become connected to adjacent risers).

The inner end of each of the arm members 256 is supported on the plate 238 (FIG. 17) by a roller 264 so that the arm 256 is free to roll in an arcuate path on the plate 238. An L-shaped bracket 266 is adjustably mounted at the end of the arm 256 by threaded rods 268 and has a pin 270 extending vertically at the end thereof.

Switch boxes 272 (FIG. 16) are mounted to the upright brackets 240 of the arm 230 at a location generally above the inner ends of the arms 256. Each switch box 272 has two sets of switches, each set containing two switches 274 and 276. The switches are part of the electrical control network for controlling the operation of the machine. One of the switches 272, 276 in each set controls the guidance of the linear system during normal operation, and the other of the switches 274, 276 in each set is a safety switch which shuts down the entire system in the event of malfunction. The switches in each set are operated by an arm 278 and cam 280 mounted to a pivot pin 282 extending downwardly from the switch box. At the lower ends of the pins 282 are mounted levers 284, 285 which extend on either side of the pin 270. The levers 284, 285 are centered by a centering pin 286 adjustably mounted in a slot 288 at the end of the switch box. The two levers 284, 285 are spring biased to a closed position as shown in FIGS. 17 and 18 by a spring 290 (FIG. 16) connected between the layers.

As noted above, the principle of operation of the guidance system is as taught by the above referenced Johnson U.S. Pat. No. 4,172,551, and in addition provides for guidance off a laterally displaced guide wire or cable. Just as with the steering control for each of the cart bogeys, only one of the linkages 250, 251 with its associated switch box 272 is in operation for a given direction of movement of the system over the field. Therefore, assuming for purposes of explanation, that the system is moving in the direction of the arrow in FIG. 1, the linkage 250 with the arm member 254 extending in the "forward" direction relative to the direction of movement of the system, and its associated switch box 272, are controlling the guidance of the linear system. If the linear system tends to move to the right as viewed in FIG. 1, such that the main tractor 36 tends to move away from the guide cable 42, the linkage 250 will be caused to pivot in a counterclockwise direction as viewed in FIGS. 17 and 19, causing the arm member 256 to swing forward. This will cause the pin 270 attached at the outer end of the arm member to swing the lever 284 in a forward or counterclockwise direction as viewed in FIG. 17 to actuate the one of the switches 274, 276. Actuation of the switch preferably controls the end tower (the tower, not shown, at the left end of the linear system) to disengage the drive of that tower and thus affect a pivotal movement of the entire linear system in a counterclockwise direction as viewed in FIG. 1, as taught by the referenced Johnson Patent. This causes the main tractor 36 to be moved toward the guide cable 42. When the linear system is back on the proper path, such that the main tractor 36 is again properly displaced within allowed tolerances from the guide cable, the linkage 250 will have pivoted back to its normal position so that the switch 274, 276 is deactuated and both of the end towers of the linear system are once again driven. In a similar manner, if the linear system tends to move to the left as viewed in FIG. 1, such that the main tractor 36 tends to move toward the guide cable 42, the linkage 250 is caused to pivot in a clockwise direction as viewed in FIG. 19, causing the pin 270 to swing the lever 285 rearwardly or in a clockwise direction as viewed in FIG. 17. This actuates the appropriate one of the switches 274, 276 in the other set of switches within the switch box to disengage the drive of the drive tower at the right end of the linear system to cause a pivotal movement of the entire linear system in a clockwise direction as viewed in FIG. 1. This moves the main tractor 36 away from the guide cable until the switch 274, 276 is deactuated to once again allow both end towers of the linear system to run.

The liquid delivery machine 10 operates in an "inch worm" fashion, moving along the pressurized main line with the couplers 30 alternately connecting and disconnecting progressively to the risers 32 as the linear system 12 moves over the field. The carts 22 are in alignment, and therefore do not pass each other, and at least one of the couplers 30 is always connected to a riser so that water is fed continuously to the linear system. Each coupler 30 connects progressively to each riser as the system moves over the field.

More specifically, assume for purposes of explanation that the system is moving in the direction of the arrow of FIG. 1, and further assume as a starting reference that both couplers 30 are connected to adjacent risers 32. When the rear coupler 30 connects to the riser 32 so that both couplers are connected to adjacent risers, water is fed through both couplers and both articulated booms 26 to the linear system. When the rear coupler connects to the riser, a switch at that coupler (see U.S. Pat. No. 4,413,783) is actuated, and is part of the electrical control network for the system, causing the forward coupler 30 to disconnect. When the forward coupler disconnects, it actuates a switch at the forward coupler, which also is part of the electrical control network, (see U.S. Pat. No. 4,413,783) engaging the motor drives 112 of the forward cart 22 to drive the forward cart in the forward direction. The forward cart will proceed forward with the forward articulated boom 26 pivoting and extending until the angle sensor 156 (FIGS. 10 and 12) senses the maximum allowable extension of the boom during normal operation by actuation of the switch 162 with the arm 169. Actuation of the switch 162 disengages the drive of the forward cart to stop the cart. Meanwhile the linear irrigation system 12 continues to move over the field at its preselected speed without interruption by the operation of the carts. As the linear system continues to move forward, the arm 169 of the angle sensor 156 moves off the switch 162 to deactuate the switch. This enables a timer which is part of the electrical control network to time out, upon which the drive of the forward cart 22 is again engaged to again cause the cart to move forward until the arm 169 again actuates the switch 162. This "jogging" action is repeated with the arm 169 "bumping" the switch 162 to stop the cart, and with the linear system continuing to move the arm away from the switch to enable the timer, after which the art begins to move once again. The "jogging" action continues until the forward cart 22 has driven along the main line to where the forward coupler 30 is over the next riser. During the entire time that the forward coupler is disconnected and the forward cart is moving from the one riser to the next, water is delivered from the rear coupler and rear articulated boom 26 to the linear system.

That the forward coupler is directly over the next riser is sensed by engagement of the switch actuator 127 (FIG. 4) at the forward end of the forward cart with the post 129 adjacent the riser. The post may also support the guide cable 42. When the switch is actuated, the drive of the forward cart 22 is disengaged to stop the cart, and the cylinder 126 is actuated to lower the forward coupler 30 into connection with the riser in the manner described in U.S. Pat. No. 4,413,783. At this point in the cycle, both couplers 30 are connected to risers such that water is being delivered from both couplers, through both articulated booms 26, to the linear system. Also, both of the articulated booms 26 are nearly fully extended. They are not completely extended because some tolerance is provided so that when both couplers are connected, the linear system may continue to move over the field at its preset speed without interruption. For example, the various lengths of the articulated boom conduit sections are such that they allow approximately plus or minus three feet (0.914 meters) of overtravel of the linear system while both couplers are connected. If the coupling/uncoupling sequence is not completed within the approximately six feet (1.828 meters) of travel, the arm 168, 169 of the appropriate angle sensor 156 will trip the switch 162 causing the main tractor to stop momentarily until the cycle is complete. If the overtravel exceeds these tolerances, the arm 168, 169 of the appropriate angle sensor 156 will trip a safety switch 164 indicatng a malfunction and shut down the system.

Connection of the forward coupler to the next riser initiates the next half cycle of operation. When the forward coupler couples to the next riser, a switch is actuated at that coupler (as described in U.S. Pat. No. 4,413,783), to cause the rear coupler to disconnect so that water is no longer fed from the rear coupler and rear articulated boom to the linear system. Upon full disconnection of the rear coupler, a switch is actuated which engages the drive of the rear cart 22 to move the rear cart in the forward direction. It continues to move forward until the angle sensor 156 of the rear boom senses the maximum allowable retracted position of the rear cart by engagement of the arm 168 with the switch 162 of the angle sensor. Meanwhile, the main tractor 36 and the entire linear system continue to move forward so that the same "jogging" action occurs with the rear cart until the rear coupler 30 is over the next riser (the riser to which the forward coupler had been previously connected). That the rear coupler is over the next riser is sensed by switch actuator 127 at the rear end of the rear coupler striking post 129 adjacent the riser to stop the rear cart and operate the cylinder 126 to extend the rear coupler into connection with the riser. Once again water is fed from both couplers and both articulated boom conduits to the linear.

Both carts now are almost fully retracted with the inner wheel bogeys of the two carts having moved past the ends of the main tractor 36, the carts and main tractor being laterally offset for this purpose. Some tolerance is provided so that the main tractor and linear system may continue to move at their preset speed with both couplers coupled in the retracted position. In other words, it is preferred that the linear system be allowed to continue its movement at its preset speed without interruption because of the operation of the carts. Also, the cart ground speed should be at least twice that of the linear system. It is customary to control the speed of a linear irrigation system by use of a percent timer which determines the length of time during a given drive cycle that the drives of the boss towers of the system are engaged. It is preferred that the boss towers of the linear system be the end towers which are also the ones controlled by the alignment control 40. The carts 22 may be controlled to run independently of the main tractor 36, or may be controlled to run only when the main tractor runs. If the ground speed of the carts is nearly equal to twice that of the main tractor, the couplers will reach the risers to which they are to connect without the angle sensor 156 stopping the cart such that the "jogging" action will not occur.

By way of example, the riser spacing may be 61.5 feet (18.92 meters) with the length of each conduit section 24 from the centerline of the coupler to the centerline of the swivel joint 136 being 25.75 feet (7.85 meters). The length of each of the conduit sections 27 from the centerline of the swivel joint 136 to the centerline of the swivel joint 184 is 32.61 feet (9.94 meters), and the length of each of the conduit sections 28 from the centerline of the swivel joint 184 to the centerline of the manifold 29 measured with the flexible joint 192 straight is 20.58 feet (6.27 meters). As the carts 22 move between extended and retracted positions, the conduit sections 28 swing in arcs of about 8.85° to each side of perpendicular to the linear system conduit 16. This is easily accommodated by the flex joints 192 without the need of a switch joint at that location. The conduit sections 27 each swing in an arc of approximately 34.3° to each side of perpendicular to the conduit section 24 as measured at the sensor 156. The distance between the inner and outer wheel bogeys of each cart measured between the wheel axes is approximately 22.35 feet (6.8 meters), and the carts are 7.38 feet (2.25 meters) wide measured from outside the wheels. The articulated booms are 8 inch O.D. (20.32 cm), as is the linear conduit 16, and are fed from a 12 inch or 15 inch (30.48 or 38.10 cm) O.D. main line 34.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

What is claimed is:

1. In a water delivery machine for delivering water from a pressurized main line to a linear irrigation system, the main line having spaced risers therealong, and wherein said water is delivered continuously as the linear system moves over the field being irrigated, said machine having fore and aft articulated booms, the inner ends of the booms connected to the linear system and the outer ends connected to couplers, said booms providing water conduits to deliver water from the couplers to the linear system, carts supporting the outer ends of said booms and the couplers to which they are connected, and means for alternately and automatically connecting the couplers to the risers as the linear system moves over the field to automatically and continuously deliver water first from one coupler and boom, and then the other coupler and boom, to the linear system, and means for guiding said machine and the linear system to which it is connected, said improvement comprising a cable extending parallel to said main line and defining a path along which the machine and linear system is to travel, each cart having sensing means cooperating with said cable for steering said cart wheels to guide said cart along said cable, said linear system including a main tractor, said cable being laterally displaced from said main tractor, an arm extending laterally from said main tractor, a pivotal linkage having a forward arm section and a lateral arm section and being pivotally connected near the outer end of said lateral arm for pivotal movement about a generally upright axis, the forward end of the forward arm section having means engaging said cable as said linear system travels over the field, whereby displacement of the main tractor relative to said cable causes said linkage to pivot and thereby translate said displacement to a deflection of said lateral arm section, and means for sensing said deflection to affect a corrective movement of said linear irrigation system to maintain within prescribed limits a fixed lateral relationship between said main tractor and said cable.

2. In the water delivery machine of claim 1 wherein the outer end of said lateral arm maintains substantially constant contact with said cable as the main tractor moves down the field.

3. In the water delivery machine of claim 2 wherein said lateral arm is resiliently supported from said main tractor.

4. In a water delivery machine for delivering water from a pressurized main line to a linear irrigation system the main line having spaced risers therealong, and wherein said water is delivered continuously as the linear system moves over the field being irrigated, said machine having fore and aft articulated booms, the inner ends of the booms connected to the linear system and the outer ends connected to couplers, said booms providing water conduits to deliver water from the couplers to the linear system, each boom including a first conduit section extending generally in the direction of travel of the linear system, and carts supporting the outer ends of said boom conduits and the couplers to which they are connected, and means for alternately and automatically connecting the couplers progressively to the risers as the linear system moves over the field to automatically and continuously deliver water first from one coupler and boom, and then the other coupler and boom, to the linear system, said improvement comprising wheeled carts supporting both the inner and outer ends of said first conduit sections, each cart including an outer wheel bogey supporting the outer end of said first conduit section, and an inner wheel bogey supporting the inner end of said first conduit section, means for guiding said machine and the linear system to which it is connected, said guiding means comprising means for steering wheels of each cart to position said couplers for coupling to the risers, and means for guiding said linear system to travel in a direction parallel to said carts, and to maintain within prescribed limits a fixed lateral relationship between said carts and said linear system, said guiding means further comprising a cable extending parallel to said main line and defining a path along which the machine and linear system is to travel, each cart having a sensing means cooperating with said cable for steering said cart wheels to guide said cart along said cable, said linear system including a main tractor, said cable being laterally displaced from said main tractor, means extending laterally from said main tractor and cooperating with said cable for sensing displacement of said main tractor relative to said cable, and means effecting a corrective movement of said linear irrigation system upon detection of a variance of the main tractor from its preselected displacement to maintain within prescribed limits a fixed relationship between said main tractor and said cable, said main tractor lateral sensing means further comprising an arm extending laterally from said main tractor, a pivotal linkage having a forward arm section and lateral arm section and being pivotally connected near the outer end of said lateral arm for pivotal movement about a generally upright axis, the forward end of the forward arm section having means engaging said cable as said linear system travels over the field, whereby displacement of the main tractor relative to said cable causes said linkage to pivot and thereby translating said displacement to a deflection of said lateral arm section, and means for sensing said deflection.

5. In the water delivery machine of claim 4 wherein the outer end of said lateral arm maintains substantially constant contact with said cable as the main tractor moves down the field.

6. In the water delivery machine of claim 5 wherein said lateral arm is resiliently supported from said main tractor.

7. In a water delivery machine for delivering water from a pressurized main line to a linear irrigation system, the main line having spaced risers therealong, and wherein said water is delivered continuously as the linear system moves over the field being irrigated, said machine having fore and aft articulated booms, the inner ends of the booms connected to the linear system and the outer ends connected to couplers, said booms providing water conduits to deliver water from the couplers to the linear system, each boom including a first conduit section extending generally in the direction of travel of the linear system, carts supporting the outer ends of said boom conduits and couplers to which they are connected, means for alternately and automatically connecting the couplers progressively to the risers as the linear system moves over the field to automatically and continuously deliver water first from one coupler and boom, and then the other coupler and boom, to the linear system, and means for guiding said machine and the linear system to which it is connected, said improvement comprising wheeled carts supporting both the inner and outer ends of said first conduit sections, each cart including an outer wheel bogey supporting the outer end of said first conduit section, and an inner wheel bogey supporting the inner end of said first conduit section, means allowing limited pivotal movement of the inner bogey relative to the outer bogey about an axis generally parallel to the direction of movement of the machine, means allowing limited rotational movement of at least a portion of said first boom conduit section about its longitudinal axis relative said bogeys, each cart having drive means for driving at least one of the cart wheels and having means for steering the wheels of said bogey, said booms and carts extending and retracting relative to the linear system as the machine and linear system travel over the field, angular displacement sensing means for sensing the maximum extension and retraction of each of said articulated booms and carts relative to the linear irrigation system, and means for stopping each cart upon sensing its maximum extension or retraction, said guiding means further comprising a cable extending parallel to said main line and defining a path along which the machine and linear system is to travel, each cart having sensing means cooperating with said cable for steering said cart wheels to guide said cart along said cable, said linear system including a main tractor, said cable being laterally displaced from said main tractor, means extending laterally from said main tractor and cooperating with said cable for detecting a variance of the main tractor from its preselected lateral displacement, and means affecting a corrective movement of said linear irrigation system upon detection of said variance to maintain within prescribed limits a fixed lateral relationship between said main tractor and said cable, said main tractor lateral detecting means further comprising an arm extending laterally from said main tractor, a pivotal linkage having a forward arm section and a lateral arm section and being pivotally connected near the outer end of said lateral arm for pivotal movement about a generally upright axis, the forward end of the forward arm section having means engaging said cable as said linear system travels over the field, whereby displacement of the main tractor relative to said cable causes said linkage to pivot and thereby translate said displacement to a deflection of said lateral arm section, and means for sensing said deflection.

* * * * *